Oct. 8, 1929.   E. ROGERS   1,730,627
FLYING MACHINE
Filed March 5, 1928   2 Sheets-Sheet 1

Inventor:
Edwin Rogers.
By Cheever & Cox
Atty.

Oct. 8, 1929.　　　　E. ROGERS　　　　1,730,627
FLYING MACHINE
Filed March 5, 1928　　　2 Sheets-Sheet 2

Inventor
Edwin Rogers.
By Cheever & Cox
Atty.

Patented Oct. 8, 1929

1,730,627

UNITED STATES PATENT OFFICE

EDWIN ROGERS, OF AURORA, ILLINOIS

FLYING MACHINE

Application filed March 5, 1928. Serial No. 259,064.

My invention relates in general to flying machines of the heavier than air type and has more particular reference to a flying machine having a novel wing construction whereby to render the operation of the machine more successful and to accomplish flying in a more simple manner than has heretofore been possible.

In its broadest scope, the devices of my invention may be applied to any form of heavier than air flying apparatus but for purposes of illustration I shall describe these devices as incorporated in a novel flying machine in which the parts are mounted and supported upon the frame of an ordinary bicycle.

An important object of my invention is to provide a flying machine having a plane, the wings of which extend rearwardly in simulation of the out-stretched wings of a bird, the extremities of the wings being hinged and having means for rapidly agitating or flapping the hinged portions with respect to the body of the plane. I have discovered from the observation of birds in flight, that their wings are not maintained at a constant angularity with respect to the body of the bird while beating up and down in flight, but that their wings constantly change their angularity, being tipped downwardly and forwardly during the down stroke of the wing beat and thereafter being turned and pointed forwardly and upwardly during the up stroke of the wing beat with the result that the wing of the bird during flight has a sort of rippling, wavy action as it travels through the air. By arranging the rearward extremities of the wings of my improved flying machine in hinged relationship with the remainder of the plane, I am able to provide a rippling wing motion having a close analogy to that of the wing of a bird in flight.

Another important object of my invention is to provide a novel method of mounting the lifting ailerons of the flying machine in a position where they may be most readily operated, to wit, upon the pedals of the bicycle to the end that the driver may by merely altering the angularity of his feet vary the angularity of the ailerons.

Still another important object of my invention is to provide a neat compact flying machine having improved characteristics of operation whereby flying may be accomplished with a minimum amount of effort.

Numerous other objects and advantages of the invention will be apparent as it is more fully understood from the following description which taken in connection with the accompanying drawings discloses a preferred embodiment of the invention.

Referring to the drawings:

Figure 3 is a vertical cross section taken substantially along the line 3—3 in Figure 2.

Figure 1:
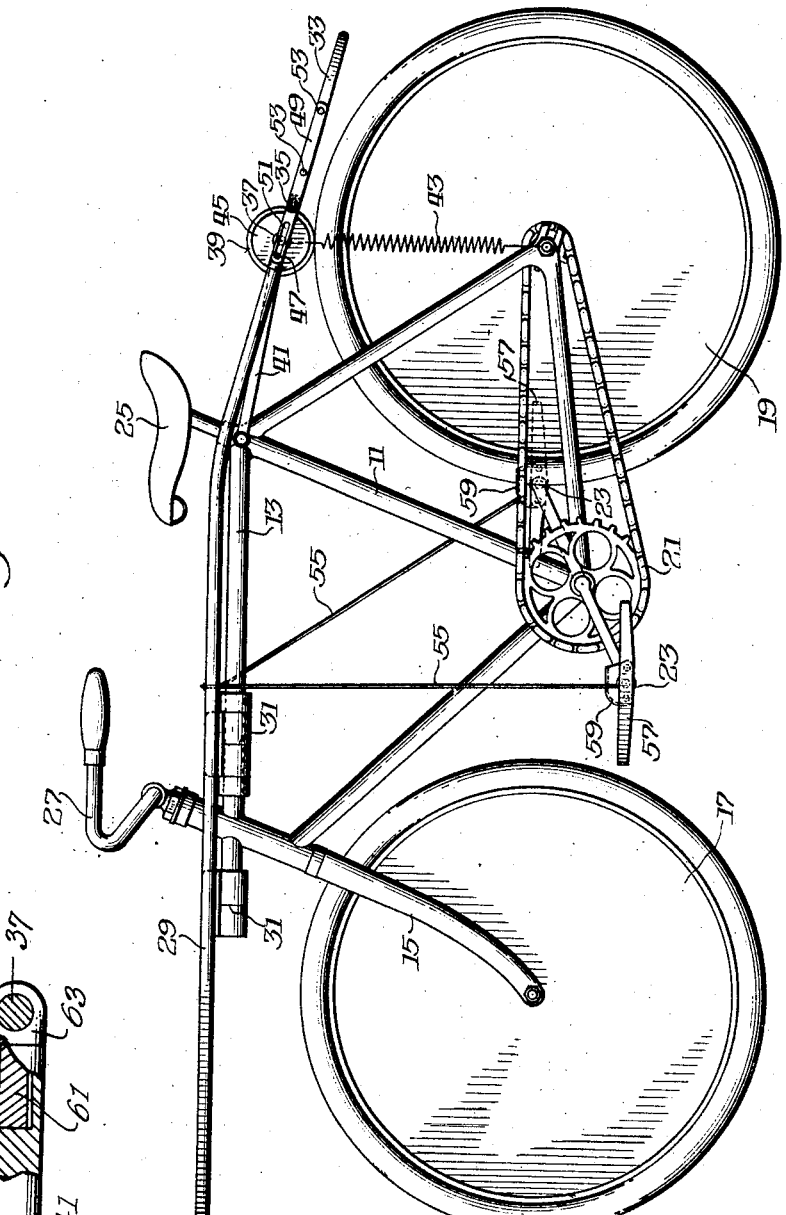
Figure 1 is a horizontal view of a machine embodying my invention.

To illustrate my invention I have shown in the drawings a bicycle having a frame 11 of which the horizontal bar is designated by the reference numeral 13. The frame carries a front forked member 15 pivotally mounted therein and in which the front wheel 17 is rotatably supported in the usual manner. A rear wheel 19 having a driving chain and sprocket 21 operated by pedals 23, a saddle 25, and handle and handle bars 27 are arranged in the frame 11 in the manner usual to bicycles.

The flying apparatus in the present instance comprises a main plane 29 having a peripheral contour formed in simulation of the out-stretched wings of a bird. This plane is pivotally mounted to the top horizontal bar 13 of the bicycle frame by means of bearings 31 and is adapted for angular rotation with respect to the frame throughout a limited path. Although I have illustrated the wings as being pivotally mounted with respect to the bicycle frame, it may be more convenient to fasten them rigidly with respect to the frame and to provide motive power for the machine other than the flapping of the wings, which means may be in the form of a propeller mounted in any convenient position in the frame and propelled by any convenient means, as from the driving chain and sprocket 21. In the illustrated embodiment, I have shown the wheels 17 and 19 formed as imperforate disks which provides a vertical plane adapted to maintain the machine in vertical position during flight, and the machine may be steered by altering the angular relationship of the plane of the front wheel by manipulating the handles and handle bars 27 in the usual manner.

Figure 2:
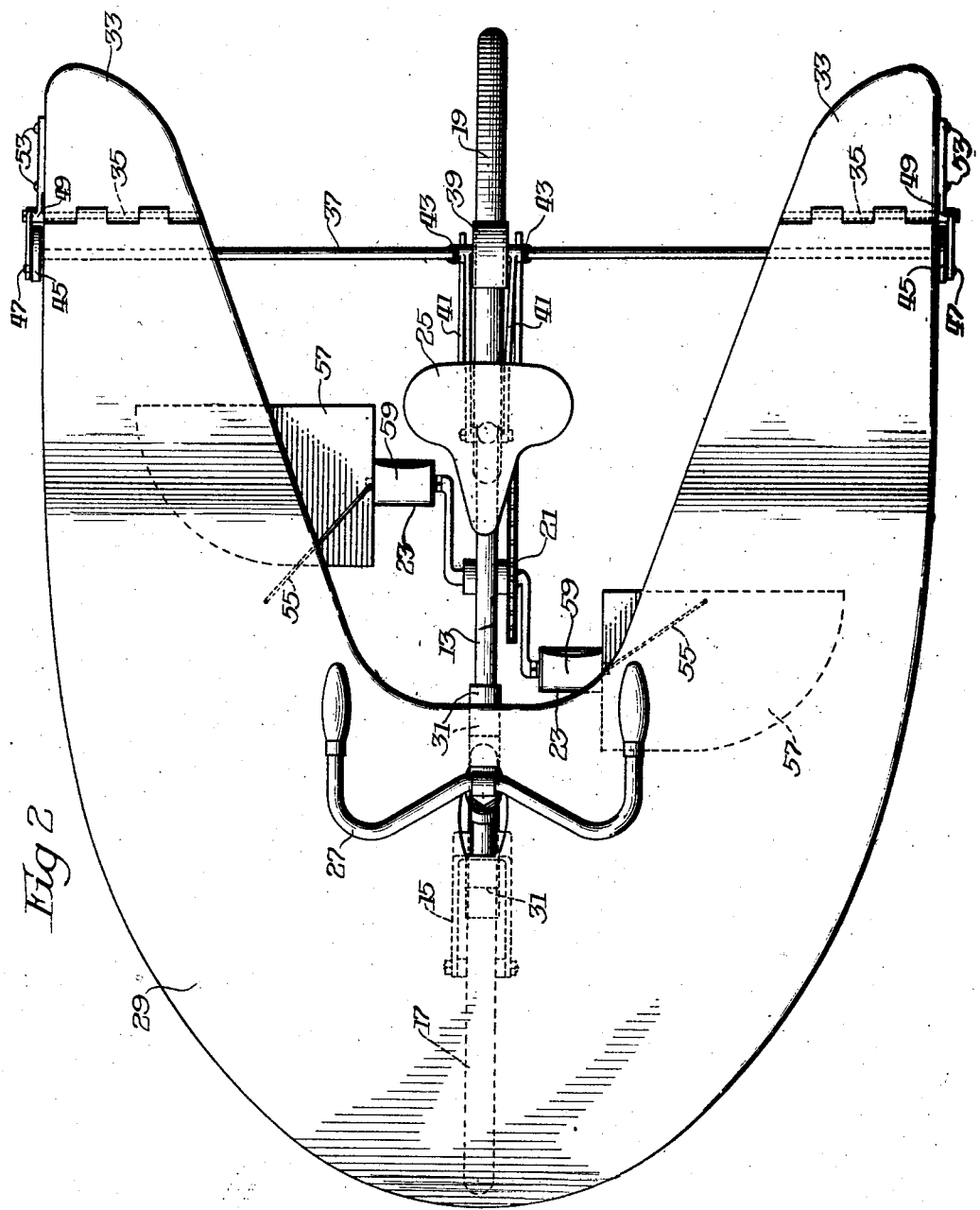
Figure 2 is a top plan view of the machine shown in Figure 1.

The outer portions of the wings, as shown in Figure 2, extend rearwardly and have hinged extremities 33 pivotally supported to the main portion of the wing by a hinged pin 35, and I provide means for rapidly and angularly rotating these hinged portions with respect to the body of the main plane in order to simulate the undulating motion of the wing of a bird in flight. In the illustrated embodiment, the means for fluttering the wing extremities 33 comprises a drive shaft 37 extending across the back of the bicycle and rotatably mounted in support members 41, pivotally mounted to the main frame of the bicycle. The drive shaft carries a roller 39 between the support members 41 in position to engage the periphery of the rear wheel which has frictional driving engagement with the roller. This driving engagement is maintained by means of springs 43 which engage between the rear wheel axle supports and support members 41 and normally urge the roller 39 downwardly into engagement with the rear wheel. To permit the roller and drive shaft 37 to rock with the wings of the machine, I prefer to journal the shaft 37 in small bearing blocks 63 which are pivotally mounted in the ends of the members 41 as shown in Figure 3 of the drawings. A roller bearing 61 may, if desired, be inserted to permit free relative movement of the bearing block in the member 41. The driving shaft extends outwardly from the roller on either side of the bicycle and is journaled at its outer extremities in the body of the main plane 29. The ends of the shaft extend outwardly of the main plane and carry crank disks 45 mounted thereon. Each disk has a crank pin 47 arranged therein at adjustable distance from the center of the disk. These pins operate in slotted portions 51 of members 49 which are secured to the hinged extremities 33. As the shaft 37 is rotated by the rear wheel, the disks 45 rotate the crank pins 47 in the slots 51 at a high rate of speed with the result that the hinged extremities 33 are flapped upwardly and downwardly with extreme rapidity and with consequent improvement in the flying characteristics of the machine.

I have also provided means for moving the plane 29 bodily with respect to the bicycle frame which means include flexible members 55 secured between the outer ends of the bicycle pedals and points in the plane so that upon rotation of the pedals the plane may be angularly moved with respect to the frame of the bicycle. Another feature which I have illustrated in the drawings comprises the provision of lifting ailerons 57 attached to the pedals and extending outwardly therefrom. These ailerons consist of auxiliary planes secured to the bicycle pedals and adapted to be rotated therewith in order to change their angular relationship with respect to the plane of the main wing structure 29. In order that these ailerons may be more easily manipulated by the feet of the operator of the machine, I have provided straps 59 extending across the pedals to provide a housing in which the feet may be secured so that they may not become removed from the pedals during flight with a consequent loss of control over the ailerons.

It will be apparent that numerous changes may be made in the form and arrangement of the various parts herein described without departing from the spirit and scope of the invention, the description herein being of a preferred embodiment for purposes of illustration only.

Having thus described my invention, what I claim as new and desire to secure by Letters Patent is:

1. In a flying machine of the heavier than air type, a main plane structure, means including a crank and a pedal for propelling said machine and a driving member secured between said plane and said pedal for the purpose of moving the plane upwardly and downwardly in a direction substantially normal to its plane, said plane having a hinged portion and means for fluttering said hinge portion with respect to said plane through a definite angular displacement.

2. In a flying machine of the heavier than air type having a main plane, means including a pedal mounted on a crank for propelling the machine, and ailerons carried by said pedal and angularly movable upon rotation of the pedal.

3. In a flying machine of the heavier than air type, a main plane structure, means including a crank and a pedal for propelling said machine and a driving member secured between said plane and said pedal for the purpose of moving the plane upwardly and downwardly in a direction substantially normal to its plane, said plane having a hinged portion and means for fluttering said hinge portion with respect to said plane through a definite angular displacement, and ailerons mounted on said pedal and extending outwardly therefrom and movable therewith whereby their angularity with respect to the main plane may be altered by manipulation of the foot of the driver.

4. In a flying machine of the heavier than air type having a main plane, means including a pedal mounted on a crank for propelling the machine, ailerons carried by said pedal and angularly movable upon rotation of the pedal, and means cooperating between the pedals and the main plane whereby the latter may be rotated angularly with respect to the frame of the machine upon rotation of the pedal crank.

5. In a flying machine of the heavier than air type, a frame, means mounted on a crank for providing the machine, ailerons carried by said means and angularly movable upon rotation thereof whereby to guide the machine in a vertical plane, a wing mounted on the frame, an imperforate disc wheel pivotally mounted in the frame and adapted for use as a landing wheel and means for controlling the angular relation of the wheel with respect to the frame whereby the wheel may be used for steering the machine in a horizontal plane when in the air.

6. In a flying machine of the heavier than air type, a frame, a wing comprising a main portion mounted to the frame and an auxiliary portion pivoted at the rear edge of said main portion, means for flapping said auxiliary portion with respect to said main portion for the purpose of simulating the wing action of a bird in flight, an imperforate disc wheel pivotally mounted in the frame and adapted for use as a landing wheel, means for controlling the angular relation of the wheel with respect to the frame whereby the wheel may be used for steering the machine in a horizontal plane, means mounted to a crank for propelling the machine and ailerons carried by said means and angularly movable upon rotation thereof whereby to steer the machine in a vertical plane when in the air.

7. In a flying machine of the heavier than air type, a main plane structure, means including a crank, a pedal for propelling said machine and a driving member secured between said plane and said pedal for the purpose of moving the plane upwardly and downwardly in a direction substantially normal to its plane, said plane having a hinged portion and means for fluttering said hinge portion with respect to said plane through a definite angular displacement, and ailerons carried by said pedal and angularly movable upon rotation of the pedal whereby to guide the machine in a vertical plane.

In witness whereof, I have hereunto subscribed my name.

EDWIN ROGERS.